(12) United States Patent
Nishida et al.

(10) Patent No.: US 11,546,480 B2
(45) Date of Patent: Jan. 3, 2023

(54) IMAGE READING APPARATUS AND IMAGE FORMING APPARATUS

(71) Applicant: FUJIFILM Business Innovation Corp., Tokyo (JP)

(72) Inventors: Yoji Nishida, Yokohama (JP); Masato Serikawa, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/391,430

(22) Filed: Aug. 2, 2021

(65) Prior Publication Data

US 2022/0272219 A1 Aug. 25, 2022

(30) Foreign Application Priority Data

Feb. 19, 2021 (JP) .............................. JP2021-025618

(51) Int. Cl.
*H04N 1/00* (2006.01)
(52) U.S. Cl.
CPC ....... *H04N 1/00554* (2013.01); *H04N 1/0057* (2013.01); *H04N 1/0083* (2013.01); *H04N 1/00795* (2013.01)
(58) Field of Classification Search
CPC ... B65H 5/06; B65H 1/04; B65H 1/18; B65H 1/00; B65H 1/28; B65H 31/20; B65H 5/02; B65H 5/22; B65H 5/26; B65H 7/00; B65H 9/00; G03G 15/00; G03G 15/08; G03G 21/16; G03G 21/00; G03G 21/18;

(Continued)

(56) References Cited

U.S. PATENT DOCUMENTS 8,228,511 B2 * 7/2012 Takuwa ............. H04N 1/00496
399/92
9,225,863 B2 * 12/2015 Miyamoto ......... H04N 1/00551
(Continued)

FOREIGN PATENT DOCUMENTS

JP 2011-077874 A 4/2011
JP 6554885 B2 8/2019

OTHER PUBLICATIONS

Feb. 22, 2022 extended Search Report issued in European Patent Application No. 21195682.6.

*Primary Examiner* — Negussie Worku
(74) *Attorney, Agent, or Firm* — Oliff PLC

(57) ABSTRACT

An image reading apparatus includes: a housing including a processing unit configured to process image information; an opening and closing member openably and closably provided on the housing, the opening and closing member including a reading unit configured to read an image from an image holding medium and configured to obtain image information from the image; a connection member that electrically connects the reading unit and the processing unit; and a protective member including a first protective member rotatably supported by the opening and closing member and a second protective member rotatably supported by the housing and rotatably connected to the first protective member, wherein rotation axial directions of the first protective member and the second protective member are the same direction as a rotation axial direction of the opening and closing member, and the connection member is accommodated in the protective member and protected by the protective member.

20 Claims, 12 Drawing Sheets

(58) Field of Classification Search
CPC ........ G03G 15/04; G03G 21/20; G03G 15/10;
G03G 15/22; G03G 9/08; G03G 9/093;
H04N 1/00; H04N 1/04; H04N 1/44;
E05F 1/12; E05F 1/00
USPC ......................................................... 358/498
See application file for complete search history.

(56) References Cited

U.S. PATENT DOCUMENTS

| | | | |
|---|---|---|---|
| 9,546,071 B1* | 1/2017 | Serikawa | B65H 5/062 |
| 9,787,865 B2* | 10/2017 | Yang | H04N 1/00551 |
| 2007/0047024 A1* | 3/2007 | Onose | H04N 1/00519 |
| | | | 358/474 |
| 2007/0122187 A1* | 5/2007 | Mase | G03G 21/1853 |
| | | | 399/111 |
| 2009/0225375 A1* | 9/2009 | Iwata | G03G 15/605 |
| | | | 358/474 |
| 2011/0075226 A1* | 3/2011 | Fujiwara | G03G 21/1652 |
| | | | 174/135 |
| 2016/0309048 A1* | 10/2016 | Yang | H04N 1/0083 |
| 2017/0024837 A1* | 1/2017 | Pandey | G07B 15/00 |
| 2022/0263968 A1* | 8/2022 | Kontani | H04N 1/1215 |

* cited by examiner

IMAGE READING APPARATUS AND IMAGE FORMING APPARATUS

CROSS-REFERENCE TO RELATED APPLICATIONS

This application is based on and claims priority under 35 USC 119 from Japanese Patent Application No. 2021-025618 filed on Feb. 19, 2021.

BACKGROUND

Technical Field

The present invention relates to an image reading apparatus and an image forming apparatus.

Related Art

Patent Literature 1 discloses an image reading apparatus including: a housing including a support base on which an original document is supported; an opening and closing member rotatably supported around a rotation shaft between an open position where an upper surface of the support base is opened and a closed position where the upper surface of the support base is closed; a reading member provided on the opening and closing member and configured to read the original document; a processing unit provided on the housing and configured to process information read by the reading member; a connection member configured to electrically connect the reading member and the processing unit; and a protective member whose one end portion is rotatably supported by the opening and closing member, and that accommodates the connection member therein, the protective member being supported in a state of hanging from the opening and closing member and in a state in which the other end portion is not restrained with respect to the housing, in which a space of the protective member in which the connection member is accommodated is formed such that the other end portion is wider than the one end portion on a side opposite to the support base.

CITATION LIST

Patent Literature

Patent Literature 1: Japanese Patent No. 6554885

SUMMARY

In the image reading apparatus disclosed in Patent Literature 1, the other end portion of the protective member is supported in a state of being not restrained with respect to the housing, and the protective member enters and exits the housing in accordance with an opening and closing operation of the opening and closing member. In addition, the connection member may break due to contact between the protective member and the connection member when the protective member enters and exits the housing.

Aspects of non-limiting embodiments of the present disclosure relate to providing an image reading apparatus and an image forming apparatus capable of preventing breakage of a connection member in a configuration that protects the connection member electrically connecting a housing and an opening and closing member that is openable and closable with respect to the housing, as compared with a configuration in which the connection member is protected by the a protective member and the housing and the protective member enters and exits the housing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus including: a housing that includes a processing unit configured to process image information; an opening and closing member openably and closably provided on the housing, the opening and closing member including a reading unit configured to read an image from an image holding medium and configured to obtain image information from the image; a connection member that electrically connects the reading unit and the processing unit; and a protective member that includes a first protective member rotatably supported by the opening and closing member and a second protective member rotatably supported by the housing and rotatably connected to the first protective member, in which rotation axial directions of the first protective member and the second protective member are the same direction as a rotation axial direction of the opening and closing member, and the connection member is accommodated in the protective member and protected by the protective member.

BRIEF DESCRIPTION OF THE DRAWINGS

Exemplary embodiment(s) of the present invention will be described in detail based on the following figures, wherein.

DETAILED DESCRIPTION

Hereinafter, an image reading apparatus and an image forming apparatus according to an exemplary embodiment of the invention will be described with reference to the drawings.

(Image Forming Apparatus)

Figure 1:
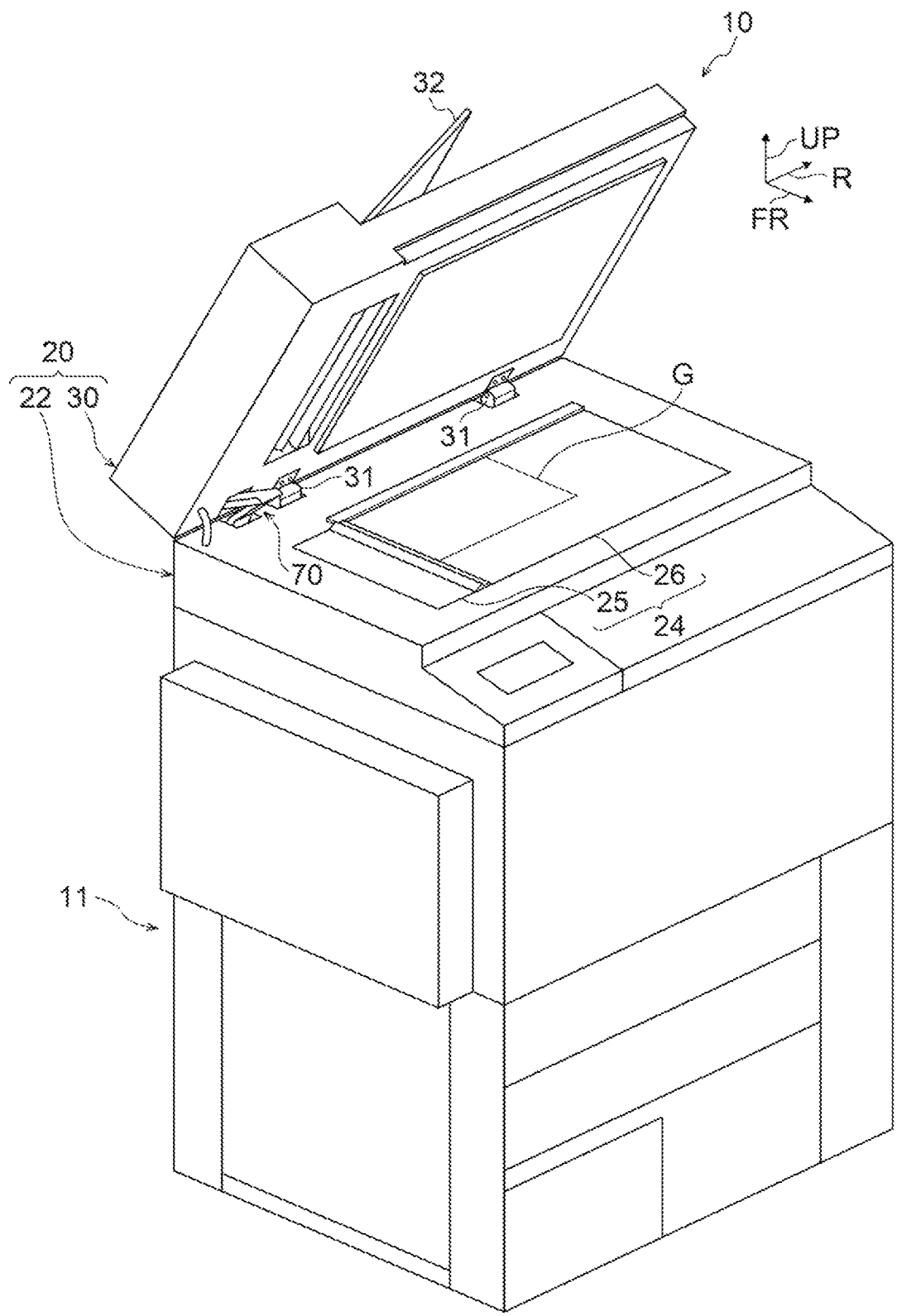
FIG. 1 is a perspective view illustrating a state in which an opening and closing member is located at an open position in an image reading apparatus according to an exemplary embodiment of the present invention.

An image forming apparatus 10 according to the present exemplary embodiment will be described. FIG. 1 illustrates a perspective view of the image forming apparatus 10.

An arrow UP illustrated in each drawing including FIG. 1 indicates an upper side (vertically upper side) of the apparatus. Therefore, a direction opposite to the arrow UP is a lower side (vertically lower side) of the apparatus. An arrow FR illustrated in each drawing including FIG. 1 indicates a front side of the apparatus. Therefore, a direction opposite to the arrow FR is a rear side of the apparatus. An arrow RH illustrated in each drawing including FIG. 1 indicates a right side of the apparatus. Therefore, a direction opposite to the arrow RH is a left side of the apparatus. Since these directions are defined for convenience of description, an apparatus configuration is not limited to these directions.

A front-rear direction and a left-right direction of the apparatus are also referred to as a lateral direction and a horizontal direction of the apparatus. Further, in each direction of the apparatus, the term "apparatus" may be omitted. That is, for example, "upper side of the apparatus" may be simply referred to as "upper side". A symbol written as "×" in a "○" in the drawings means an arrow directed from a front side to a back side of a paper surface. Further, a symbol written as "·" in a "○" in the drawings means an arrow directed from the back side to the front side of the paper surface.

The image forming apparatus 10 illustrated in FIG. 1 is an apparatus that forms an image. Specifically, as illustrated in FIG. 1, the image forming apparatus 10 includes an image forming apparatus main body 11 and an image reading apparatus 20. Hereinafter, each part of the image forming apparatus 10 will be described.

The image forming apparatus main body 11 illustrated in FIG. 1 is a part in which each component of the image forming apparatus 10 is provided. Specifically, the image forming apparatus main body 11 is configured in a box-shaped housing.

The image forming apparatus main body 11 is provided with a medium accommodation portion, an image forming unit, a feeding mechanism, a medium output portion, and the like, which are not illustrated. The image reading apparatus 20 is provided at an upper end portion of the image forming apparatus main body 11.

The medium accommodating portion is a part that accommodates a recording medium (not illustrated), and the medium output portion is a part to which the recording medium on which an image is formed by the image forming unit is output. The feeding mechanism is a mechanism that feeds the recording medium from the medium accommodation portion to the image forming unit, and feeds the recording medium on which an image is formed by the image forming unit from the image forming unit to the medium output portion.

The image forming unit is a part that forms an image on the recording medium sent out from the medium accommodation portion. Examples of the image forming unit include an inkjet image forming unit that forms an image on the recording medium using ink, an electrophotographic image forming unit that forms an image on the recording medium using toner, or the like.

In the inkjet image forming unit, for example, an image is formed on the recording medium by ejecting ink droplets from an ejecting unit onto the recording medium. As the inkjet image forming unit, an image may be formed on the recording medium by ejecting ink droplets from the ejecting unit onto a transfer body and transferring the ink droplets from the transfer body onto the recording medium.

In the electrophotographic image forming unit, for example, charging, exposure, development, transfer, and fixing steps are performed to form an image on the recording medium. As the electrophotographic image forming unit, an image may be formed on the recording medium by performing charging, exposure, development, and transfer steps to form an image on a transfer body, transferring the image from the transfer body to the recording medium, and then fixing the image on the recording medium.

In the image forming apparatus 10, when an image of an original document G (see FIG. 2) as an example of an image holding medium is to be copied, the image forming unit forms an image that is read by a reading unit 28 and a reading sensor 54 (see FIG. 2), as an example of a reading unit, which will be described later, of the image reading apparatus 20, on the recording medium.

Examples of the image forming unit are not limited to the inkjet image forming unit and the electrophotographic image forming unit, and various image forming units may be used.

(Image Reading Apparatus)

Figure 2:
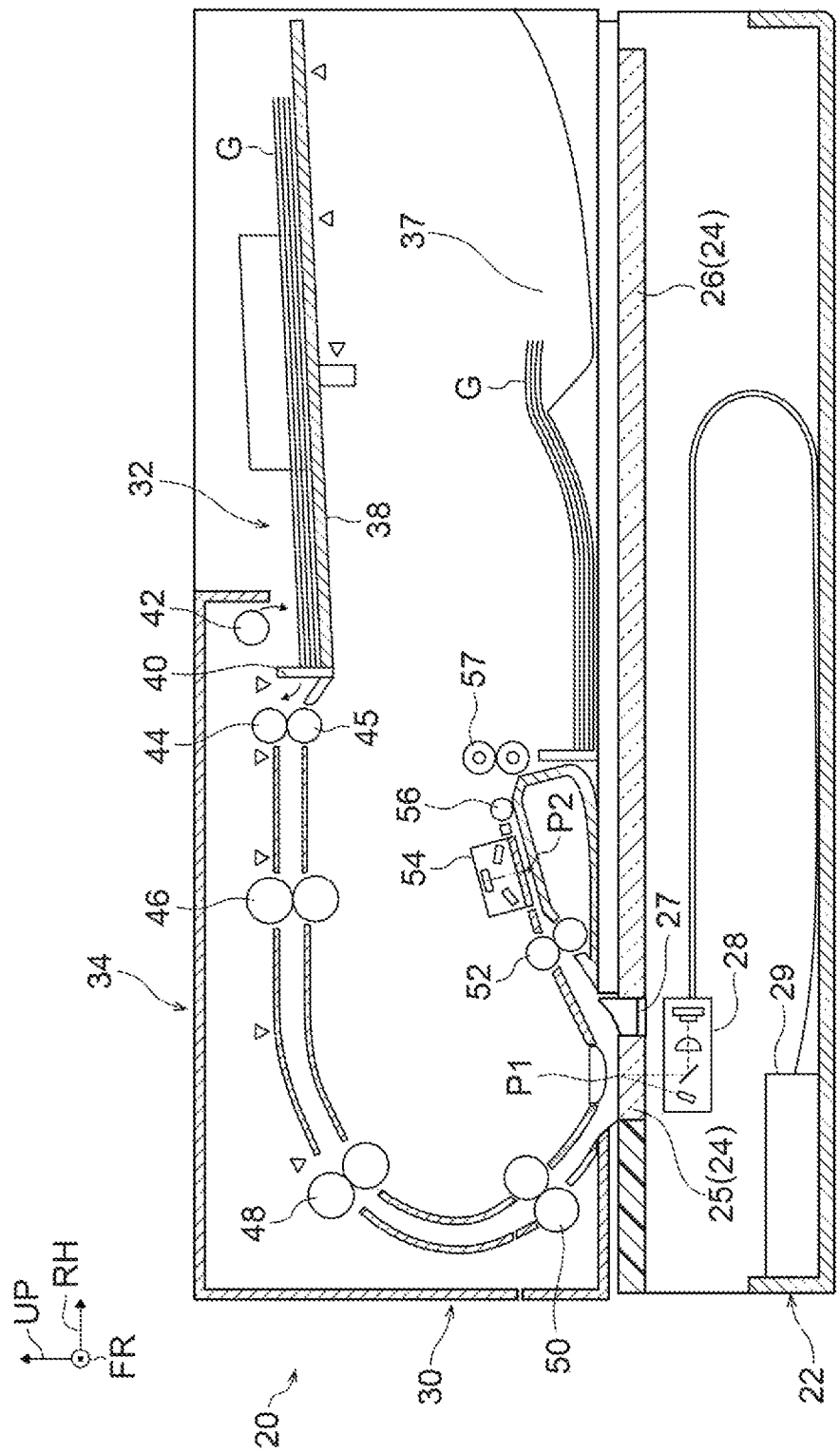
FIG. 2 is a schematic view of the image reading apparatus according to the present exemplary embodiment.

FIG. 1 is a perspective view illustrating a state in which an original document feeding apparatus 30, which will be described later, is located at an open position in the image reading apparatus 20. FIG. 2 is a schematic diagram of the image reading apparatus 20.

The image reading apparatus 20 illustrated in FIG. 2 is an apparatus that reads the image of the original document G. The image reading apparatus 20 includes a reading apparatus main body 22 as an example of a housing, the original document feeding apparatus 30 as an example of an opening and closing member, an FFC 60 as an example of a connection member, and a protective member 70.

—Reading Apparatus Main Body—

The reading apparatus main body 22 is formed in a box shape, and includes a transparent original document table 24 at an upper end thereof. An original document feeding apparatus 30 is disposed on an upper surface of the reading apparatus main body 22. The original document feeding apparatus 30 is provided on the reading apparatus main body 22 so as to be capable of opening and closing the original document table 24. That is, the original document feeding apparatus 30 is rotatably supported by the reading apparatus main body 22.

A reading window 25 through which the original document G passes is disposed at a left end portion of the original document table 24. The original document G fed by the original document feeding apparatus 30 passes through the reading window 25. A platen glass 26 on which the original document G placed by a user is supported is disposed on a right side of the reading window 25. An original document guide 27 is supported between the reading window 25 and the platen glass 26. The original document guide 27 guides the original document G that passed through the reading window 25 into the original document feeding apparatus 30.

Inside the reading apparatus main body 22, the reading unit 28 as an example of a first reading unit is disposed below the original document table 24. The reading unit 28 is supported so as to be movable in a left-right direction, as an example of a sub-scanning direction, along a lower surface of the original document table 24. The reading unit 28 normally stops at an initial position illustrated in FIG. 2.

An image processing unit 29, as an example of a processing unit, is disposed below the reading unit 28 inside the reading apparatus main body 22. The image processing unit 29 is electrically connected to the reading unit 28.

The image processing unit 29 converts electric signals of red R, green G, and blue B input from the reading unit 28 into image information of black K, yellow Y, magenta M, and cyan C, and temporarily stores the image information. The image processing unit 29 outputs the stored image information as image information to the image forming unit of the image forming apparatus main body 11 at a preset time.

—Original Document Feeding Apparatus—

The original document feeding apparatus 30 includes an original document feeding tray 32 as an example of an original document loader in which plural original documents G to be copied are stacked and accommodated. An original document feeding unit 34 is provided on a left side of the original document feeding tray 32. The original document feeding unit 34 feeds the original document G on the original document feeding tray 32 onto the original document table 24. An original document output tray 37, as an example of an original document output portion, is disposed below the original document feeding tray 32. The original document G that passed through the original document table 24 is output from the original document feeding unit 34 to the original document output tray 37.

The original document feeding tray 32 includes a feeding tray main body 38. The feeding tray main body 38 is formed in a plate shape extending obliquely upward to the right.

A set gate 40, as an example of an alignment member for the original document G, is disposed at a left end portion of the original document feeding tray 32. The set gate 40 is rotatably supported. The set gate 40 is held in a suspended state before the original document G is fed, and the front end of the original document G in a feeding direction may abut on the set gate 40 so as to be aligned. When the feeding of the original document G is started, the holding of the set gate 40 is released, and the set gate 40 becomes rotatable to a downstream side, so that the feeding of the original document G is not hindered.

A pickup roller 42 as an example of an original document pickup member is disposed above the set gate 40 and upstream in the feeding direction of the original document G. The pickup roller 42 is configured to be movable up and down.

A feed roller 44 as an example of an original document feeding member is disposed downstream of the set gate 40. A separation roller 45, as an example of an original document separation member, is disposed below the feed roller 44 so as to face the feed roller 44.

A feed roller 46, as an example of the original document feeding member having an inclination correction function, is disposed downstream of the feed roller 44.

A feed roller 48, as an example of the original document feeding member, is disposed downstream of the feed roller 46.

A feed roller 50, as an example of the original document feeding member, is disposed downstream of the feed roller 48. The feed roller 50 adjusts a timing at which the original document G is fed toward a reading position P1 on a first surface.

A feed roller 52, as an example of an original document feeding member, is disposed downstream of the feed roller 50 and more downstream than the reading position P1 on the first surface. A reading position P2 on a second surface of the original document G is set on a downstream side of the feed rollers 52. The reading sensor 54, as an example of a second reading unit, is disposed at the reading position P2 on the second surface. The reading sensor 54 is composed of a contact image sensor (CIS).

A reading roller 56, as an example of an auxiliary member for reading, is disposed downstream of the reading sensor 54. An output roller 57 that outputs the original document G to the original document output tray 37 is disposed downstream of the reading roller 56.

The original document feeding apparatus 30 is supported by the reading apparatus main body 22 so as to be openable and closable around a pair of left and right rotation shafts 31. The rotation shaft 31 is an example of a second rotation shaft. The rotation shaft 31 is configured to be movable in an upper-lower direction in response to reading of thick books such as dictionaries. Note that a technique known in a related art may be used for a configuration in which the rotation shaft 31 is movably supported in the upper-lower direction.

—Connection Member—

The FFC 60 and a cable 62 extend between the reading apparatus main body 22 and the original document feeding apparatus 30. The FFC 60 electrically connects the reading sensor 54 and the image processing unit 29. The FFC 60 transmits image information read by the reading sensor 54 to the image processing unit 29. On the other hand, the cable 62 as an example of another connection member is used for power supply to a drive motor of each roller and communication of a control signal to the drive motor. "FFC" is an abbreviation for flexible flat cable.

Figure 3:
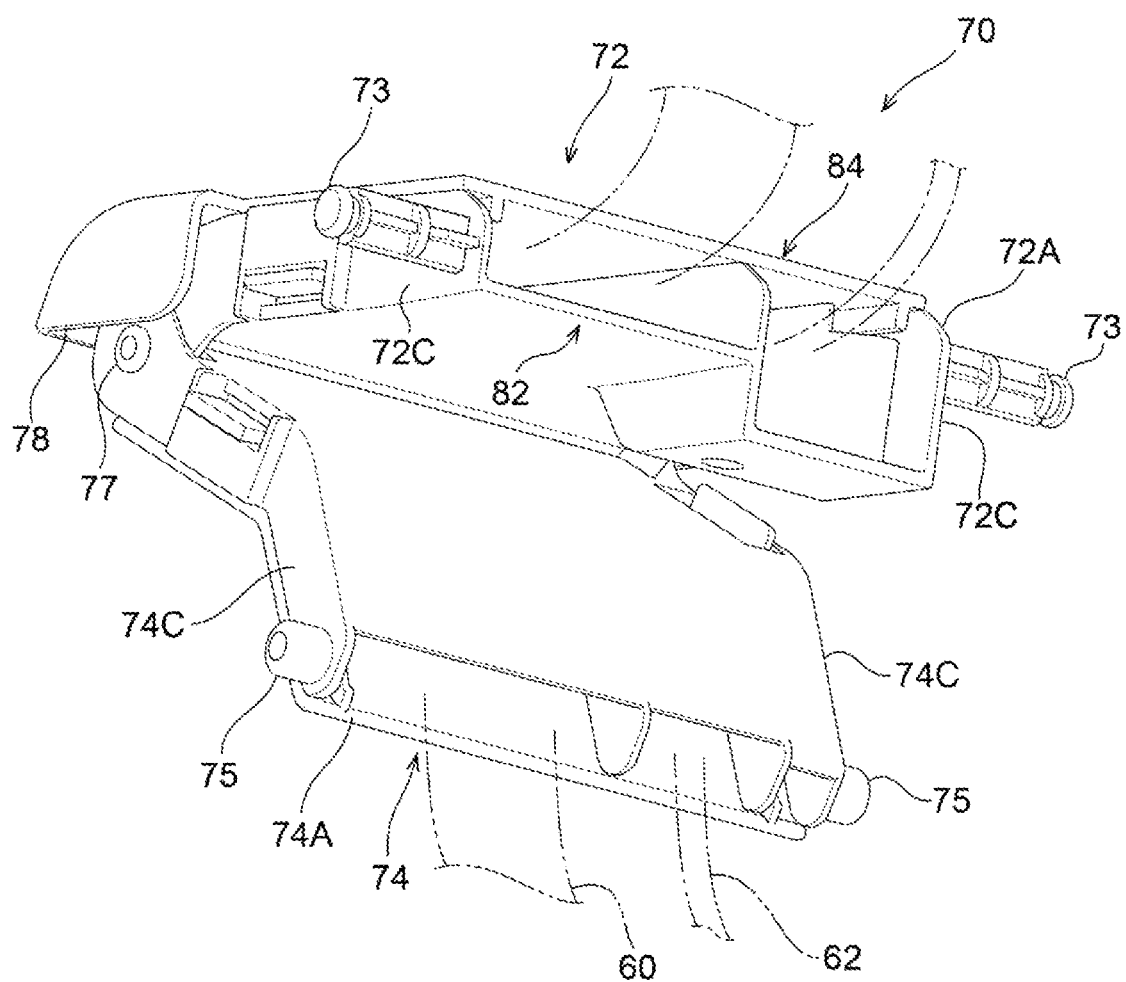
FIG. 3 is a perspective view of a protective member used in the image reading apparatus according to the present exemplary embodiment.
Figure 4:
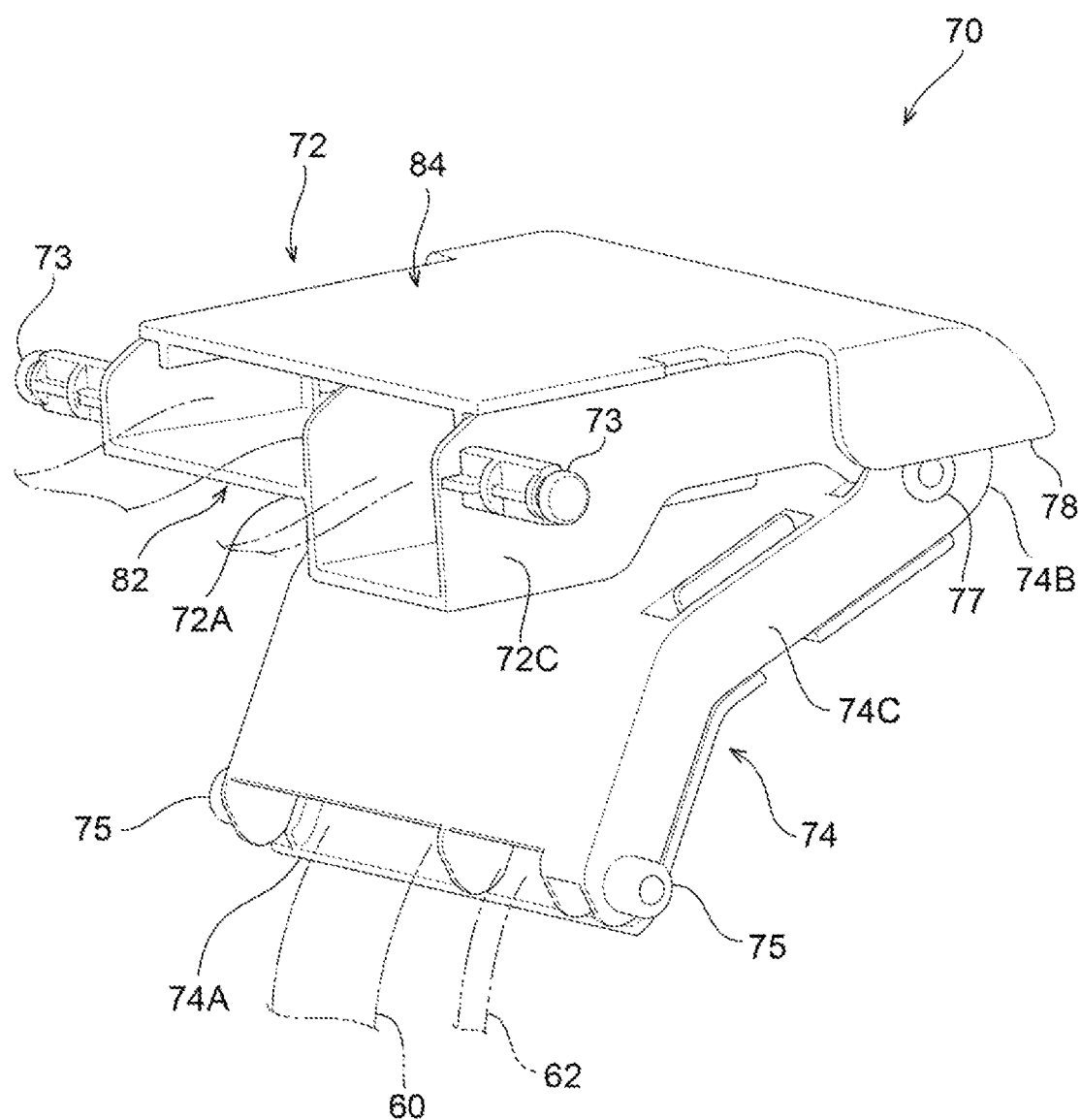
FIG. 4 is a perspective view of the protective member used in the image reading apparatus according to the present exemplary embodiment.
Figure 5:
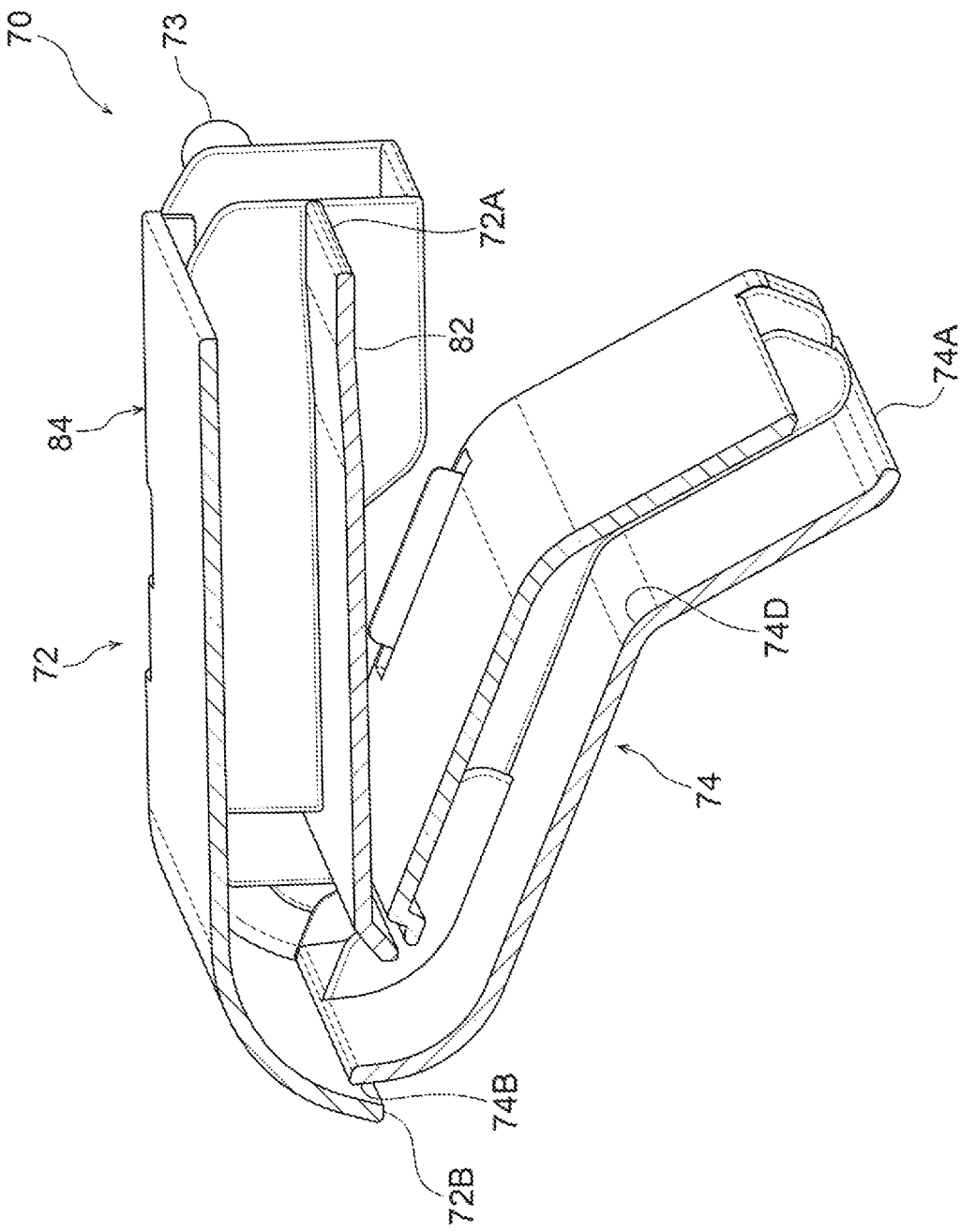
FIG. 5 is a schematic cross-sectional view of the protective member used in the image reading apparatus according to the present exemplary embodiment.
Figure 6:
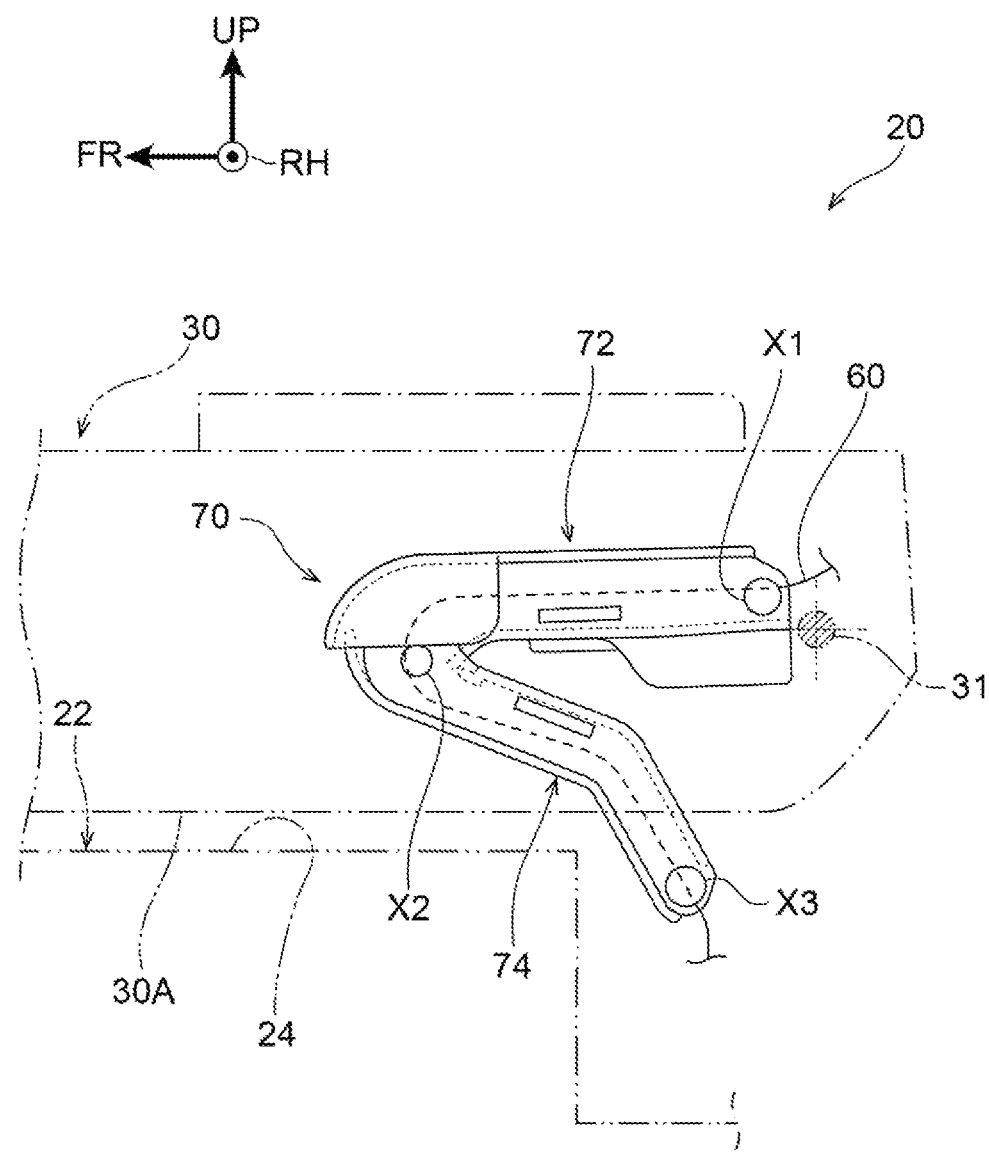
FIG. 6 is a side view of the protective member illustrating a state in which the opening and closing member used in the image reading apparatus according to the present exemplary embodiment is closed with respect to a housing.
Figure 7:
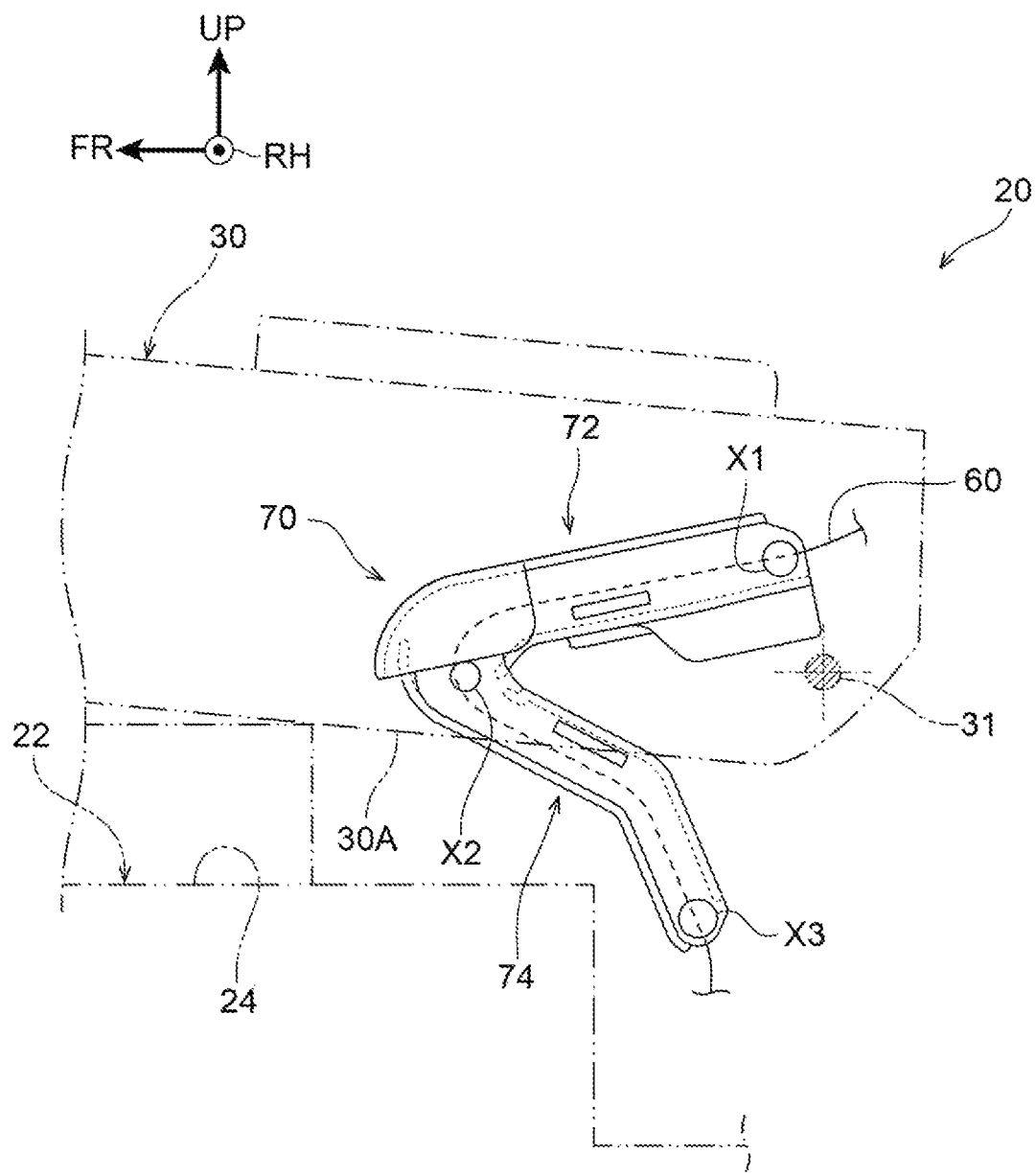
FIG. 7 is a side view of the protective member illustrating a state in which the opening and closing member is open with respect to the housing in FIG. 6.
Figure 8:
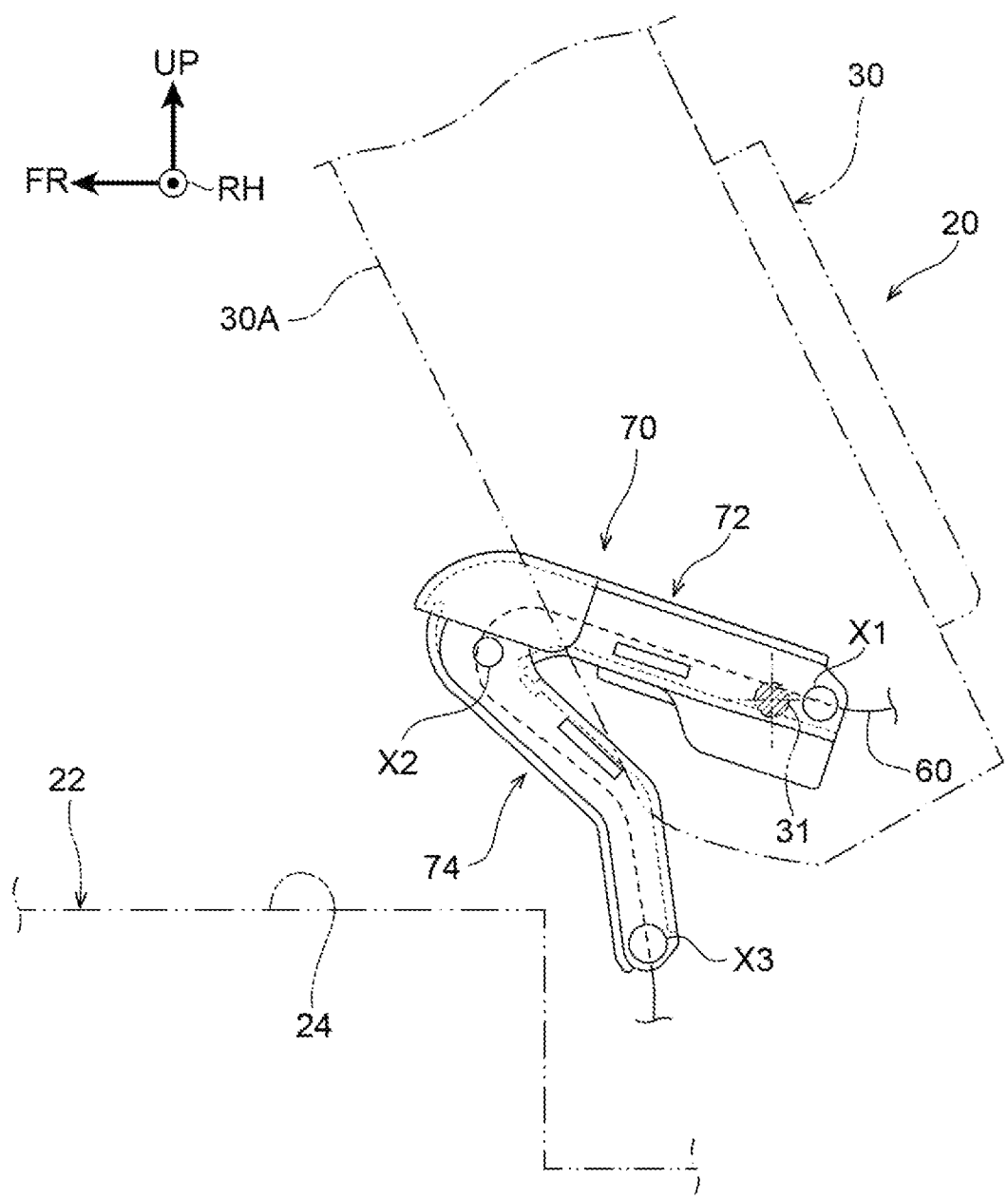
FIG. 8 is a side view of the protective member illustrating a state in which the opening and closing member in FIG. 6 is opened to the maximum open position with respect to the housing.
Figure 9:
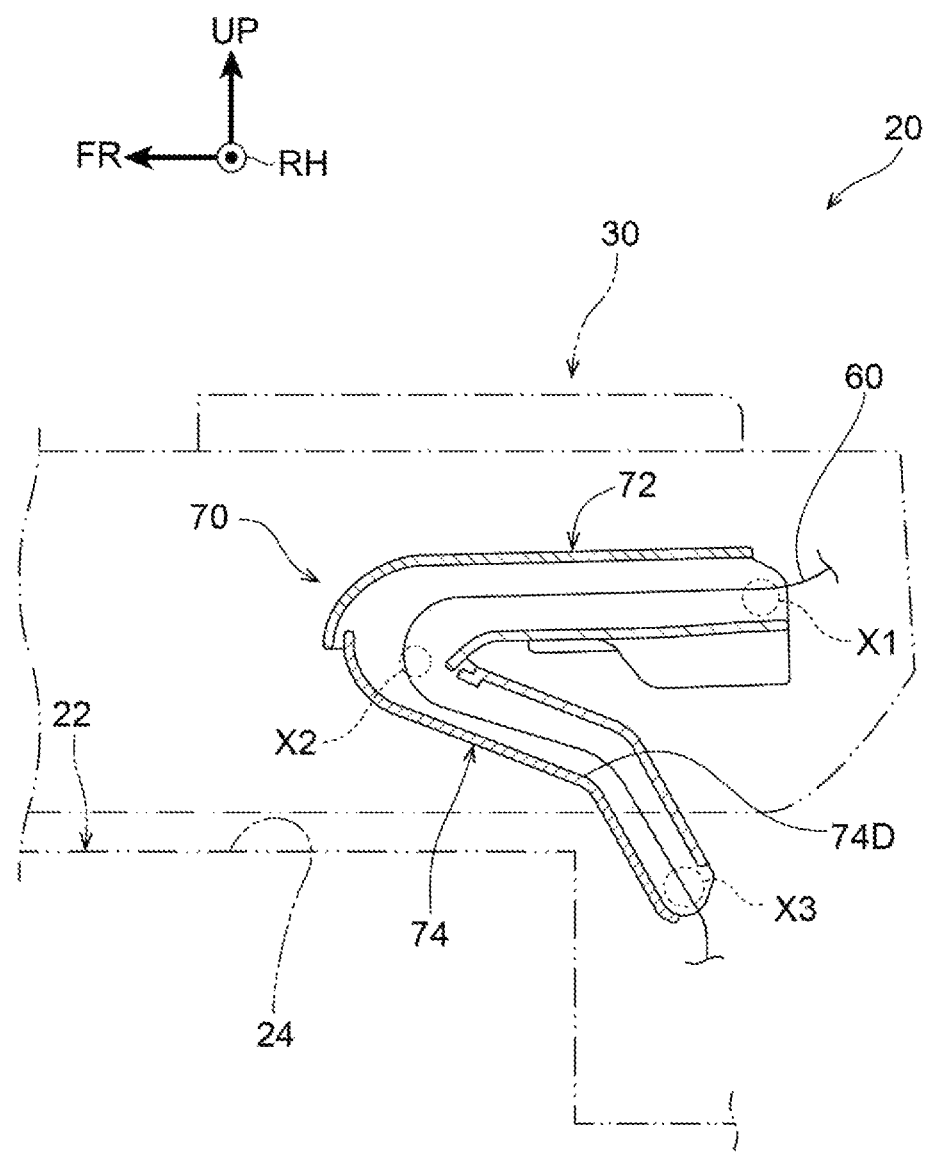
FIG. 9 is a side cross-sectional view of the protective member illustrated in FIG. 6.
Figure 10:
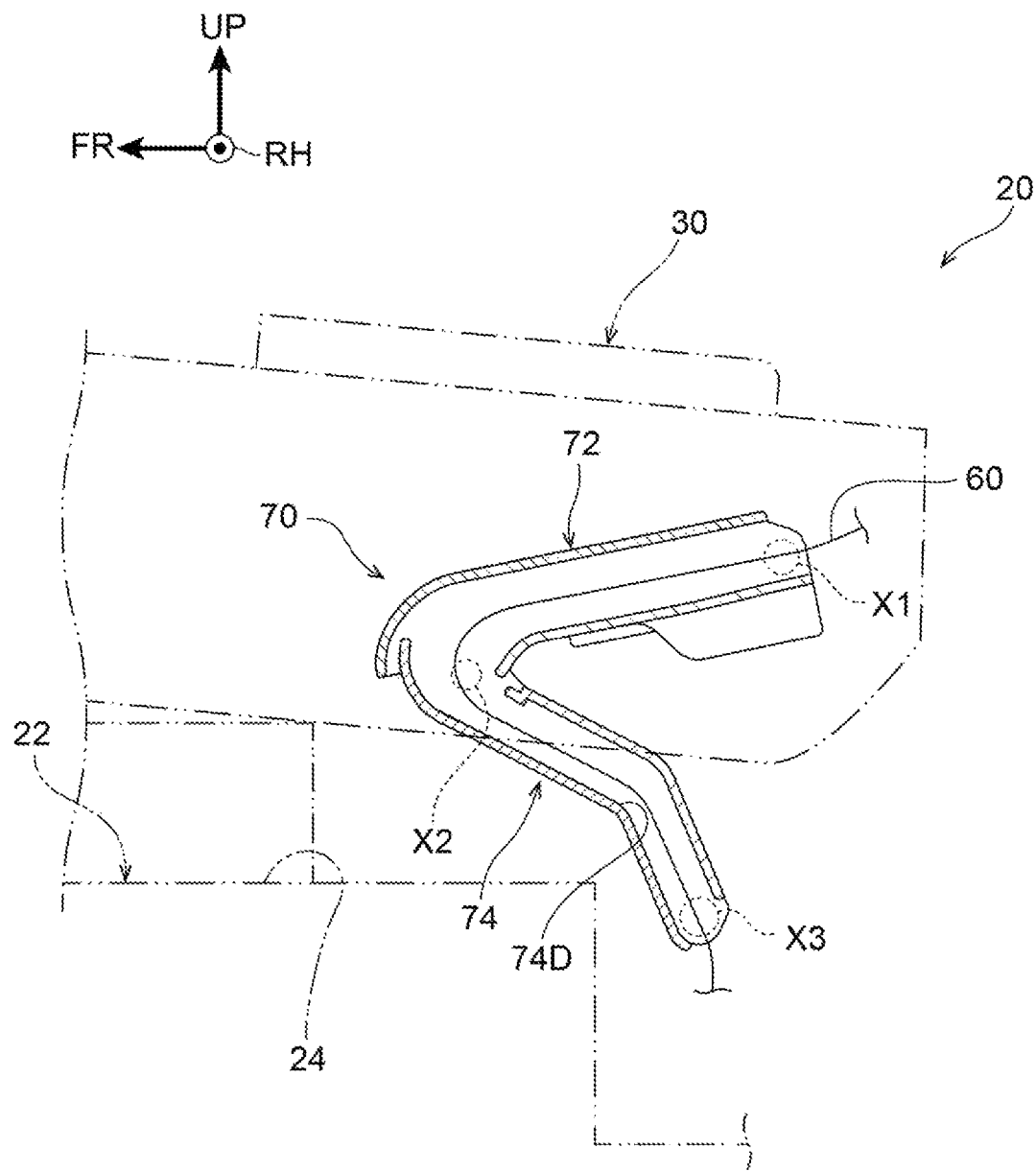
FIG. 10 is a side cross-sectional view of the protective member illustrated in FIG. 7.
Figure 11:
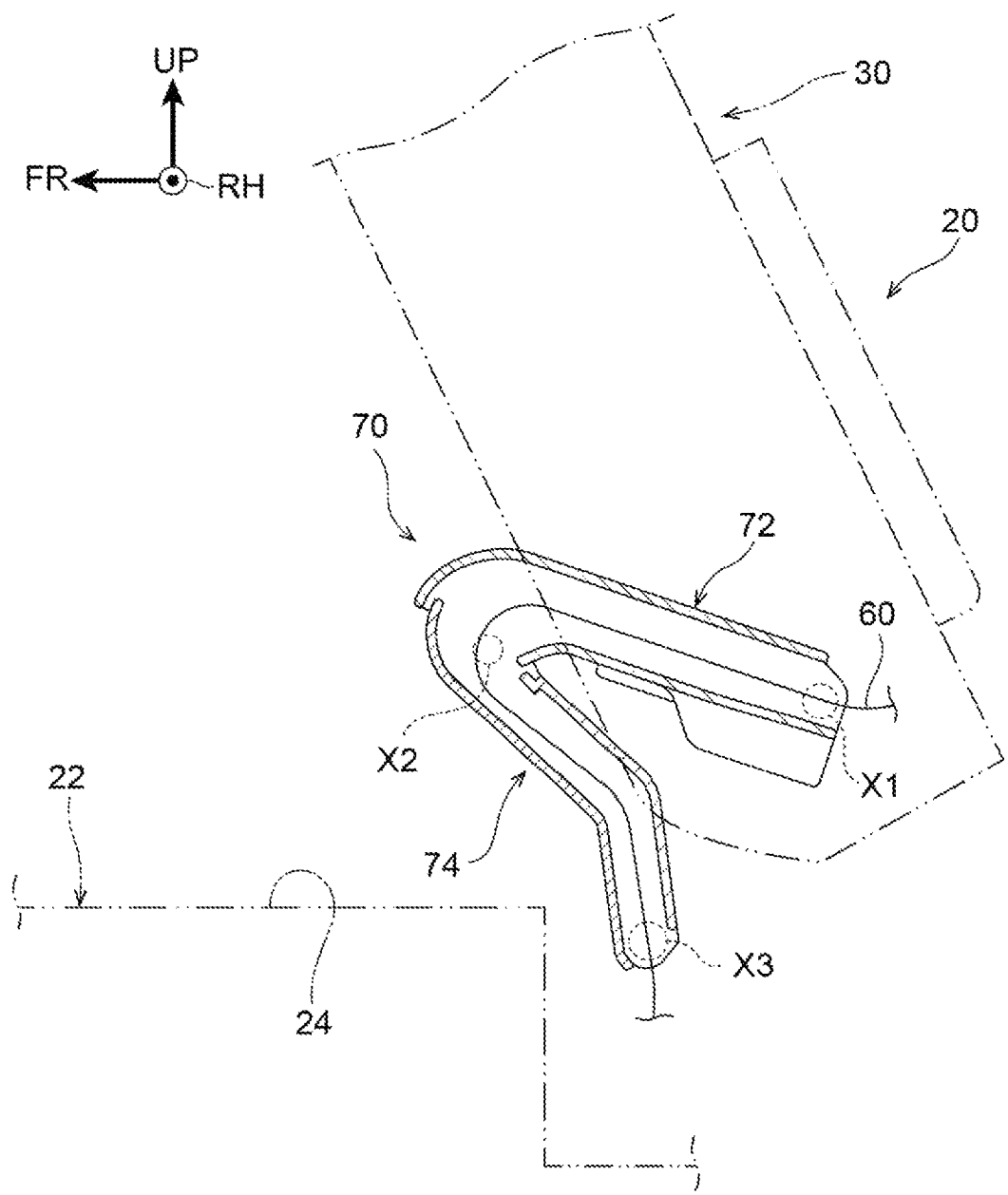
FIG. 11 is a side cross-sectional view of the protective member illustrated in FIG. 8.

FIGS. 3 and 4 are perspective views of the protective member 70, and FIG. 5 is a cross-sectional view of the protective member 70. Further, FIG. 6 is a side view of the protective member 70 illustrating a state in which the original document feeding apparatus 30 is closed with respect to the reading apparatus main body 22, and FIG. 9 is a side cross-sectional view of the protective member 70 illustrated in FIG. 6. FIG. 7 is a side view of the protective member 70 illustrating a state in which the original document feeding apparatus 30 is open with respect to the reading apparatus main body 22, and FIG. 10 is a side cross-sectional view of the protective member 70 illustrated in FIG. 7. FIG. 8 is a side view of the protective member 70 illustrating a state in which the original document feeding apparatus 30 is opened to the maximum open position with respect to the reading apparatus main body 22, and FIG. 11 is a side cross-sectional view of the protective member 70 illustrated in FIG. 8. Here, the "maximum open position" is a position when the original document feeding apparatus 30 is maximally opened (when the original document feeding apparatus 30 is opened to the maximum limit).

As illustrated in FIG. 3, the protective member 70 is a member that accommodates the FFC 60 and the cable 62 therein so as to protect the FFC 60 and the cable 62. The protective member 70 includes a first protective member 72 and a second protective member 74.

As illustrated in FIGS. 6 to 8, one end portion 72A of the first protective member 72 is rotatably supported by the original document feeding apparatus 30. Specifically, shaft portions 73 are respectively provided on one end portion 72A sides of two side walls 72C of the first protective member 72, and the shaft portions 73 are supported by bearing portions (not illustrated) provided in the original document feeding apparatus 30, so that the first protective member 72 is rotatable with respect to the original document feeding apparatus 30. In the present exemplary embodiment, the two shaft portions 73 of the first protective member 72 are each referred to as a rotation shaft X1 as an example of a first rotation shaft that connects the original document feeding apparatus 30 and the first protective member 72. The present invention is not limited to this configuration. For example, the bearing portion may be provided on the one end portion 72A side of the two side walls 72C of the first protective member 72, and shaft portions may be provided in the original document feeding apparatus 30. In this case, the shaft portions of the original document feeding apparatus 30 are each referred to as the rotation shaft X1.

As illustrated in FIGS. 6 to 8, one end portion 74A of the second protective member 74 is rotatably supported by the reading apparatus main body 22. Specifically, shaft portions 75 are respectively provided on one end portion 74A sides of two side walls 74C of the second protective member 74, and the shaft portions 75 are supported by bearing portions (not illustrated) provided in the reading apparatus main body 22, so that the second protective member 74 is rotatable with respect to the reading apparatus main body 22. In the present exemplary embodiment, the two shaft portions 75 of the second protective member 74 are each referred to as a rotation shaft X3 as an example of a fourth rotation shaft that connects the reading apparatus main body 22 and the second protective member 74. The present invention is not limited to this configuration. For example, the bearing portions may be provided on the one end portion 74A sides of the two side walls 74C of the second protective member 74, and shaft portions may be provided in the reading apparatus main body 22. In this case, the shaft portions of the reading apparatus main body 22 are each referred to as the rotation shaft X3.

The other end portion 74B of the second protective member 74 is rotatably connected to the other end portion 72B of the first protective member 72. Specifically, bearing portions (not illustrated) are respectively provided on the other end 74B sides of the two side walls 74C of the second protective member 74. Shaft portions 77 are respectively provided on the other end portion 72B sides of the two side walls 72C of the first protective member 72. The shaft portions 77 are respectively supported by the bearing portions on the other end portion 74B sides of the second protective member 74, so that the first protective member 72 is rotatable with respect to the second protective member 74. In other words, the first protective member 72 and the second protective member 74 are rotatable with respect to the two shaft portions 77. In the present exemplary embodiment, the two shaft portions 77 of the first protective member 72 are each referred to as a rotation shaft X2 as an example of a third rotation shaft that connects the first protective member 72 and the second protective member 74. The present invention is not limited to this configuration. For example, the shaft portions may be provided on the other end portion 74B sides of the two side walls 74C of the second protective member 74, and the bearing portions may be provided on the other end portion 72B sides of the two side walls 72C of the first protective member 72. In this case, the shaft portions on the other end portion 74B sides of the second protective member 74 are each referred to as the rotation shaft X2.

Axial directions of the rotation shafts X1 to X3 are the same as the axial direction of the rotation shaft 31. In the present exemplary embodiment, "the same direction" means that the rotation shafts X1, X2, and X3 are parallel to the rotation shafts 31.

Further, as illustrated in FIG. 6, in the state in which the original document feeding apparatus 30 is closed, the rotation shaft X1 is located closer to an opening side of the original document feeding apparatus 30 and an opening and closing end side of the original document feeding apparatus 30 than the rotation shafts 31. Specifically, the rotation shaft X1 is located on an upper side and a front side of the rotation shafts 31. Incidentally, the opening side of the original document feeding apparatus 30 is a direction in which the original document feeding apparatus 30 is open, and in the present exemplary embodiment, the opening side refers to the upper side of the original document feeding apparatus 30. Further, the open and close end side of the original document feeding apparatus 30 means a free end side of the original document feeding apparatus 30, and in the present exemplary embodiment, refers to a front side of the original document feeding apparatus 30.

In the present exemplary embodiment, the rotation shaft X1 being located on the upper side and the front side of the rotation shafts 31 includes the rotation shaft X1 being located on a line along the horizontal direction (the apparatus front-rear direction) from the axial centers of the rotation shafts 31 and the rotation shaft X1 being positioned on a line along a vertical direction (the apparatus upper-lower direction) from the axial centers of the rotation shafts 31.

Further, as illustrated in FIG. 6, in the state in which the original document feeding apparatus 30 is closed, the rotation shaft X2 is located closer to the open and close end side of the original document feeding apparatus 30 than the rotation shaft X1 and the rotation shaft X3.

Further, as illustrated in FIG. 8, in the state in which the original document feeding apparatus 30 is opened to the maximum open position (the maximum position), the rotation shaft X1 is located closer to a side opposite to the open and close end side of the original document feeding apparatus 30 than the position of the rotation shafts 31 in the state in which the original document feeding apparatus 30 is closed. In other words, in the state in which the original document feeding apparatus 30 is opened to the maximum open position, the rotation shaft X1 is located on the rear side of the rotation shafts 31.

Further, as illustrated in FIG. 8, in the state in which the original document feeding apparatus 30 is opened to the maximum open position, the rotation shaft X1 is located closer to a side opposite to the opening side of the original document feeding apparatus 30 than the rotation shaft X2. Specifically, in the state in which the original document feeding apparatus 30 is opened to the maximum open position, the rotation shaft X1 is located on a rear side of the rotation shaft X2. The side opposite to the opening side of the original document feeding apparatus 30 is the direction (closing direction) opposite to the direction in which the original document feeding apparatus 30 is opened, and in the present exemplary embodiment, refers to a lower side of the original document feeding apparatus 30.

As illustrated in FIGS. 3 and 4, the first protective member 72 includes a cover portion 78 that covers a connecting portion (around the shaft portion 77) between the first protective member 72 and the second protective member 74 from the outside. Specifically, the first protective member 72 includes a lower member 82 that forms an accommodation portion that accommodates the FFC 60 and the cable 62, and an upper member 84 that closes the accommodation portion of the lower member 82. The lower member 82 is provided with the shaft portion 77. The upper member 84 is provided with the cover portion 78 so as to cover the shaft portion 77 from the outside.

A support portion 74D that supports the FFC 60 and the cable 62 is provided inside the second protective member 74. The support portion 74D is curved in a middle part of the support portion 74D. Specifically, the support portion 74D is formed on a bottom surface of the accommodation portion of the lower member 82. A degree of curvature (for example, a radius of curvature) of the support portion 74D is set to a degree that does not cause defects in the FFC 60 and the cable 62.

The protective member 70 accommodates the FFC 60 and the cable 62 as described above. As illustrated in FIG. 3, the inside of the protective member 70 is partitioned into a part accommodating the FFC 60 and a part accommodating the cable 62. Specifically, both the first protective member 72 and the second protective member 74 are provided with partition portions.

A recessed portion 86 that accommodates the protective member 70 in a state in which the original document feeding apparatus 30 is closed is provided on an opening and closing surface 30A (in the present exemplary embodiment, a surface facing the original document table 24) of the original document feeding apparatus 30. The first protective member 72 is accommodated in the recessed portion 86.

Figure 12:
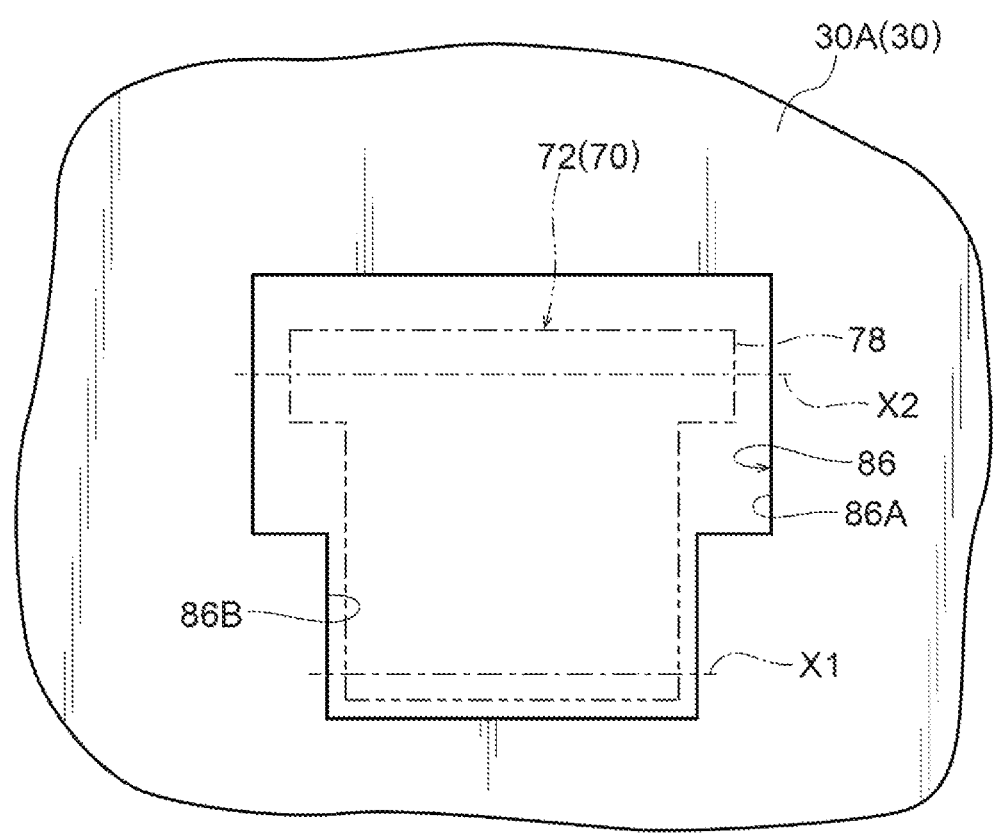
FIG. 12 is a plan view illustrating a part of an opening and closing surface of the opening and closing member used in the image reading apparatus according to the present exemplary embodiment.

Further, in the recessed portion 86, the width of the part in which the connecting portion between the first protective member 72 and the second protective member 74 is accommodated is wider than the width of the other part. Specifically, as illustrated in FIG. 12, the recessed portion 86 is formed in a T shape in a plan view, and the connecting portion between the first protective member 72 and the second protective member 74 and the cover portion 78 of the first protective member 72 that covers the connecting portion are accommodated in a wide part 86A of the T shape. On the other hand, the one end portion 72A side of the first protective member 72 is accommodated in a narrow part 86B of the T shape.

Operation According to Present Exemplary Embodiment

In the image reading apparatus 20, the first protective member 72 is rotatably supported by the original document feeding apparatus 30, and the second protective member 74 is rotatably supported by the reading apparatus main body 22. Further, the first protective member 72 and the second protective member 74 are rotatably connected to each other. Therefore, as illustrated in FIGS. 9 to 11, even when the original document feeding apparatus 30 is opened from the closed state to the maximum open position, the FFC 60 and the cable 62 are protected by the protective member 70. Further, since the first protective member 72 is rotatably supported by the original document feeding apparatuse 30 and the second protective member 74 is rotatably supported by the reading apparatus main body 22, a path length (a length of the accommodation part of the cable) from one end to the other end of the protective member 70 does not change with respect to an opening and closing operation of the original document feeding apparatus 30. Therefore, for example, as compared with a configuration in which the protective member enters and exits the reading apparatus main body 22, a movement of each cable is suppressed during the opening and closing operation of the original document feeding apparatus 30. Accordingly, breakage of the cables due to contact between the protective member 70 and the cables may be suppressed.

Further, the rotation shaft X1 is located closer to the opening side of the original document feeding apparatus 30 and the opening and closing end side of the original document feeding apparatus 30 than the rotation shaft 31 connecting the reading apparatus main body 22 and the original document feeding apparatus 30. With such a configuration, as illustrated in FIGS. 6 to 8, the protective member 70 moves upward in accordance with an opening operation of the original document feeding apparatus 30.

Further, since the rotation shaft X2 is located closer to the open and close end side of the original document feeding apparatus 30 than the rotation shaft X1 and the rotation shaft X3 in the state in which the original document feeding apparatus 30 is closed, for example, compared to a configuration in which the rotation shaft X2 is located closer to the side opposite to the open and close end side of the original document feeding apparatus 30 than the rotation shaft X1 and the rotation shaft X3, it is possible to suppress the protruding of a part of the protective member 70 to the outside of the reading apparatus main body 22.

Further, in the state in which the original document feeding apparatus 30 is opened to the maximum open position, the rotation shaft X1 is located closer to the side opposite to the open and close end side of the original document feeding apparatus 30 than the position of the rotation shafts 31 that connect the reading apparatus main body 22 and the original document feeding apparatus 30 in the state in which the original document feeding apparatus 30 is closed. Therefore, breakage of the cable may be suppressed as compared with a configuration in which the rotation shaft X1 in the state in which the opening and closing member is opened to the maximum open position is located closer to the open and close end side of the original document feeding apparatus 30 than the position of the rotation shaft 31 in the state in which the original document feeding apparatus 30 is closed.

Further, in a state in which the original document feeding apparatus 30 is opened to the maximum open position, the rotation shaft X1 is located on the side opposite to the opening side of the original document feeding apparatus 30 than the rotation shaft X2. Therefore, as compared with a configuration in which the rotation shaft X1 is located closer to the opening side of the original document feeding apparatus 30 than the rotation shaft X2 in the state in which the original document feeding apparatus 30 is opened to the maximum open position, it is possible to reduce the amount of movement of the rotation shaft X2 in a horizontal direction (the apparatus front-rear direction) during the opening and closing operation of the original document feeding apparatus 30.

The first protective member 72 includes the cover portion 78 that covers the connecting portion between the first protective member 72 and the second protective member 74 from the outside. Therefore, compared to a configuration in which the connecting portion between the first protective member 72 and the second protective member 74 is exposed, an object may be prevented from being caught in the connecting portion between the first protective member 72 and the second protective member 74.

The support portion 74D that supports the cable is provided inside the second protective member 74, and the support portion 74D is curved in a middle part of the support portion 74D. Therefore, as compared with a configuration in which the support portion extends straight, it is possible to reduce a load acting on a connecting portion between the FFC 60 and the image processing unit 29 and a connecting portion between the FFC 60 and the reading sensor 54 during the opening and closing operation of the original document feeding apparatus 30.

The opening and closing surface 30A of the original document feeding apparatus 30 is provided with the recessed portion 86 that accommodates the first protective member 72 of the protective member 70 in a state in which the original document feeding apparatus 30 is closed. Therefore, as compared with a configuration in which a recessed portion is provided on a reading apparatus main body 22 side, foreign matter may be prevented from entering the recessed portion 86.

In the recessed portion 86, the width of the part in which the connecting portion between the first protective member 72 and the second protective member 74 is accommodated is wider than the width of the other part. Therefore, compared to a configuration in which the width of the recessed portion 86 is constant, it is possible to adjust the position of the original document feeding apparatus 30 with respect to the reading apparatus main body 22, and an object may be prevented from being caught between the recessed portion 86 and the protective member 70 when the original document feeding apparatus 30 is closed.

The protective member 70 also accommodates the cable 62 different from the FFC 60. Therefore, an increase in the number of components may be suppressed as compared with a configuration in which plural cables are respectively protected by plural protective members.

The inside of the protective member 70 is partitioned into the part accommodating the FFC 60 and the part accommodating the cable 62. Therefore, as compared with a configuration in which the FFC 60 and the cable 62 are mixed inside the protective member 70, wear between the FFC 60 and the cable 62 may be suppressed.

The rotation shaft 31 is movable in the upper-lower direction. Therefore, when a thick image holding medium (for example, a dictionary) is placed on the original document table 24, the rotation shaft 31 moves upward. Accordingly, the original document feeding apparatus 30 presses a thick image holding medium from above. Therefore, as compared with a configuration in which a position of the rotating shaft 31 in the upper-lower direction is fixed, even when the thick image holding medium is disposed on the original document table 24, the thick image holding medium may be reliably pressed down and reading accuracy is improved.

In the above-described exemplary embodiment, the rotating shaft X1 is disposed on the upper side and the front side of the rotation shaft 31 in the state in which the original document feeding apparatus 30 is closed, but the present invention is not limited to this configuration. For example, the rotation shaft X1 may be disposed on an axis of the rotation shaft 31. In this case, an amount of movement of the protective member 70 that moves with the opening and closing operation of the original document feeding apparatus 30 may be reduced as compared with a configuration in which the rotation shaft X1 is deviated from the axis of the rotation shaft 31.

The present invention is not limited to the above-described exemplary embodiments, and various modifications, changes, and improvements may be made without departing from the scope of the present invention. For example, the modifications illustrated above may be combined with each other as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a housing comprising a processing unit configured to process image information;
   an opening and closing member openably and closably provided on the housing, the opening and closing member comprising a reading unit configured to read an image from an image holding medium and configured to obtain image information from the image;
   a connection member that electrically connects the reading unit and the processing unit; and
   a protective member comprising:
   a first protective member rotatably supported by the opening and closing member and
   a second protective member rotatably supported by the housing and rotatably connected to the first protective member,
   wherein rotation axial directions of the first protective member and the second protective member are the same direction as a rotation axial direction of the opening and closing member, and
   wherein the connection member is accommodated inside the protective member throughout an entire path length of the protective member, from one end to another end of the protective member, so as to be protected by the protective member.

2. The image reading apparatus according to claim 1, further comprising:
   a first rotation shaft connecting the opening and closing member and the first protective member; and
   a second rotation shaft connecting the housing and the opening and closing member,
   wherein in a state in which the opening and closing member is closed, the first rotation shaft is located closer to an opening side of the opening and closing member and an opening and closing end side of the opening and closing member than the second rotation shaft.

3. The image reading apparatus according to claim 2, further comprising:
   a third rotation shaft connecting the first protective member and the second protective member; and
   a fourth rotation shaft connecting the housing and the second protective member,
   wherein in the state in which the opening and closing member is closed, the third rotation shaft is located closer to the opening and closing end side of the opening and closing member than the first rotation shaft and the fourth rotation shaft.

4. The image reading apparatus according to claim 3, wherein in a state in which the opening and closing member is opened to a maximum position, the first rotation shaft is located closer to a side opposite to the opening and closing end side of the opening and closing member than a position of the second rotation shaft in the state in which the opening and closing member is closed.

5. The image reading apparatus according to claim 4, wherein in the state in which the opening and closing member is opened to the maximum position, the first rotation shaft is located closer to a side opposite to the opening side of the opening and closing member than the third rotation shaft.

6. The image reading apparatus according to claim 5, wherein the protective member further comprises a connecting portion that connects the first protective member and the second protective member, and
the first protective member comprises a cover portion that covers the connecting portion from an outside.

7. The image reading apparatus according to claim 3, wherein the protective member further comprises a connecting portion that connects the first protective member and the second protective member, and
the first protective member comprises a cover portion that covers the connecting portion from an outside.

8. The image reading apparatus according to claim 4, wherein the protective member further comprises a connecting portion that connects the first protective member and the second protective member, and
the first protective member comprises a cover portion that covers the connecting portion from an outside.

9. The image reading apparatus according to claim 2,
wherein the protective member further comprises a connecting portion that connects the first protective member and the second protective member, and
the first protective member comprises a cover portion that covers the connecting portion from an outside.

10. The image reading apparatus according to claim 2,
wherein the second protective member comprises a support portion that supports the connection member inside the second protective member, and
wherein the support portion is curved in a middle part of the support portion.

11. The image reading apparatus according to claim 1, further comprising:
a first rotation shaft connecting the opening and closing member and the first protective member; and
a second rotation shaft connecting the housing and the opening and closing member,
wherein in the state in which the opening and closing member is closed, the first rotation shaft is located on an axis of the second rotation shaft.

12. The image reading apparatus according to claim 11, wherein the protective member further comprises a connecting portion that connects the first protective member and the second protective member, and
the first protective member comprises a cover portion that covers the connecting portion from an outside.

13. The image reading apparatus according to claim 1,
wherein the protective member further comprises a connecting portion that connects the first protective member and the second protective member, and
the first protective member comprises a cover portion that covers the connecting portion from an outside.

14. The image reading apparatus according to claim 1,
wherein the second protective member comprises a support portion that supports the connection member inside the second protective member, and
wherein the support portion is curved in a middle part of the support portion.

15. The image reading apparatus according to claim 1,
wherein the opening and closing member comprises a recessed portion on an opening and closing surface of the opening and closing member, the recessed portion in which the protective member is accommodated in a state in which the opening and closing member is closed.

16. The image reading apparatus according to claim 15,
wherein the protective member further comprises a connecting portion that connects the first protective member and the second protective member, and
in the recessed portion, a width of a part in which the connecting portion is accommodated is wider than a width of another part.

17. The image reading apparatus according to claim 1,
wherein the protective member accommodates another connection member different from the connection member.

18. The image reading apparatus according to claim 17,
wherein an inside of the protective member is partitioned into a part accommodating the connection member and a part accommodating the other connection member.

19. The image reading apparatus according to claim 1, further comprising a second rotation shaft connecting the housing and the opening and closing member,
wherein the housing comprises a support surface that supports the image holding medium, and
wherein the second rotation shaft is movable in a direction orthogonal to the support surface.

20. An image forming apparatus comprising:
the image reading apparatus according to claim 1 that is configured to read an image from an image holding medium and obtain image information; and
an image forming unit that is configured to form an image on a recording medium based on the image information.

* * * * *